United States Patent [19]
Matsuo et al.

[11] Patent Number: 4,731,199
[45] Date of Patent: Mar. 15, 1988

[54] ULTRA HIGH MOLECULAR WEIGHT CONCURRENTLY SINTERED AND CROSS-LINKED POLYETHYLENE PRODUCT

[75] Inventors: Tadao Matsuo, Kakogawa; Fumio Matsuoka, Kobe; Nobuo Yokota; Masaaki Yamamoto, both of Hyogo, all of Japan

[73] Assignee: Mitsuboshi Belting Ltd., Kobe, Japan

[21] Appl. No.: 879,824

[22] Filed: Jun. 26, 1986

Related U.S. Application Data

[60] Continuation of Ser. No. 707,390, Mar. 1, 1985, abandoned, which is a division of Ser. No. 549,828, Nov. 9, 1983, Pat. No. 4,518,552.

[51] Int. Cl.⁴ .......................... H01B 1/02; H01B 1/06
[52] U.S. Cl. .................................. 252/511; 252/512; 252/518; 428/36
[58] Field of Search .................. 252/511, 512, 518

[56] References Cited

U.S. PATENT DOCUMENTS

| | | | |
|---|---|---|---|
| 3,958,066 | 5/1976 | Imamura | 252/512 |
| 4,126,661 | 11/1978 | Fulconis et al. | 264/209 |
| 4,171,338 | 11/1979 | Mason | 264/211 |
| 4,391,741 | 7/1983 | Masamoto et al. | 252/511 |
| 44,545,926 | 10/1985 | Fouts, Jr. et al. | 252/511 |

Primary Examiner—John E. Kittle
Assistant Examiner—James J. Seidleck
Attorney, Agent, or Firm—Wood, Dalton, Phillips, Mason & Rowe

[57] ABSTRACT

The invention is a concurrently sintered and cross-linked ram extruded product formed by a mixture of an ultra high molecular weight polyethylene powder with a cross-linking agent, an electrically conductive agent and a lubricant. As little as 0.5 parts per 100 parts of polyethylene of the electrically conductive agent added to the ultra high molecular weight polyethylene powder coats the power to provide adequate conductivity without adversely affecting the mechanical properties of the product.

12 Claims, 4 Drawing Figures

ULTRA HIGH MOLECULAR WEIGHT CONCURRENTLY SINTERED AND CROSS-LINKED POLYETHYLENE PRODUCT

This application is a continuation of application Ser. No. 707,390, filed Mar. 1, 1985, now abandoned, which is a division of application Ser. No. 549,828, filed Nov. 9, 1983, now U.S. Pat. No. 4,518,552.

BACKGROUND OF THE INVENTION

This invention relates to the forming of sintered material of ultra high molecular weight polyethylene (hereinafter abbreviated to "UHMW-PE") and, more particularly, to a method of producing a sintered material of UHMW-PE having an extremely high dimensional accuracy, i.e. a very small displacement (the difference between the maximum diameter and the minimum diameter) at longitudinally spaced positions such as in a rod or a pipe. Where the product has a rounded surface, the invention provides a highly accurate roundness thereof. Still further, the invention is concerned with providing a product having a highly uniform electric conductivity by ram extruding a mixture of the UHMW-PE with a lubricant, a cross-linking agent and/or an electroconductive agent.

The formed product has improved wear resistance, low temperature properties, impact resistance, stress cracking resistance, etc., as compared with the ordinary polyethylene. Round rods and pipes produced by the invention are advantageously adapted for use as bearings, gears, rollers, guide rails, timing screws, and other products requiring self-lubricating properties, a low friction coefficient and/or wear resistance.

UHMW-PE has been heretofore extruded into rods and pipe products. However, these products have had poor displacement characteristics, i.e. high displacement. For example, round rods or pipes extruded from a conventional ram extruder and fed to a cooling stand (such as round rods or pipes of UHMW-PE having larger than approximately 50 mm outer diameter) are irregularly cooled, and have been found to have variations in the dimensions of the outer diameter (i.e. displacement) of over approximately 2 mm. The external appearance of such products is deteriorated, thereby further decreasing the value of a product.

To improve the roundness of such rods or pipes, a method of producing such round rods or pipes has been attempted to limit the displacement (such as approximately 1 to 2 mm). This method includes the steps of covering the entire peripheral surface of the rod or pipe immediately upon extrusion from the extrusion outlet with a paper tube, and then uniformly gradually cooling the surface of the covered sintered material. This method has the serious disadvantage of substantially reducing the cooling rate of the product, requiring that the cooling stand be greatly increased in length, such as to 10 to 30 m.

Further, such extruded conventional UHMW-PE has been found to have greater than $10^{18}$ $\Omega$·cm volumetric intrinsic resistance, and greater than $10^{13}$ $\Omega$ surface resistance, i.e. large electric insulation. Thus, static electricity is readily charged on the surface of the extruded product, with the result that dust and particulate contaminants readily adhere to the surface of the product, presenting serious problems in many applications. Thus, the use of such a product in handling foodstuffs and the like is seriously limited. Further, such UHMW-PE products cannot be employed in atmospheres of inflammable powder dust, such as coal or coke dust capable of being exploded by a spark of a static electricity or a flame, or in an atmosphere using an organic solvent.

Resultingly, it is desirable to impart an increased electric conductivity to the UHMW-PE product. Thus, particulate carbon black, carbon fibers, or metallic powder are generally employed as an electroconductive agent to impart increased electric conductivity to the formed UHMW-PE product. However, if the ratio of the electroconductive agent to the UHMW-PE is more than 1 wt percent, the extrusion pressure increases greatly, thereby causing substantial difficulty in ram extrusion thereof to form a sintered material. If a lubricant is added to the mixture to decrease the extrusion pressure, the conductivity of the extruded product surface portion is undesirably reduced.

SUMMARY OF THE INVENTION

It is a primary object of this invention to provide an improved method of extruding a sintered UHMW-PE product which eliminates the drawbacks of the conventional UHMW-PE product-forming materials and which provides a cylindrical or tubular UHMW-PE product having excellent roundness uniformity characteristics.

Another object of this invention is to provide a method of extruding a sintered material of UHMW-PE having substantially uniform electric conductivity throughout in a product which may also have excellent roundness uniformity characteristics.

In one embodiment of the invention, there is provided a method of extruding a sintered material of UHMW-PE in which a predetermined amount of a lubricant and an organic peroxide is uniformly dispersed with the UHMW-PE powder. The mixture is extruded by a ram extruder to form selectively a cylindrical rod or tube of sintered material.

The invention further comprehends a method of extruding a sintered UHMW-PE product in which an electroconductive agent, an organic peroxide, and a lubricant are mixed with the UHMW-PE powder. The uniformly dispersed mixture is extruded by a ram extruder to form a UHMW-PE product.

It has unexpectedly been found that the addition of the organic peroxide to the UHMW-PE increases the melting viscosity in the sintering step due to crosslinking, so that the shape-holding property of the sintered material is substantially improved, and the resultant cylindrical rod or tubular product has high uniform roundness. As a result, the length of the cooling stand of the extruder can be greatly reduced, such as to less than one-half of the conventional length.

Depletion of the lubricant from the surface layer is effectively prevented in the sintering step as a result of the increase in melt viscosity. Thus, the density of the electroconductive agent in the surface layer remains similar to that of the interior of the product, thereby providing improved uniform conductivity.

It has been found that when the organic peroxide is omitted, lubricant is transferred to the surface layer due to the extruding pressure and is bloomed. Resultingly, the electrical conductivity of the surface portion is undesirably reduced.

In carrying out the present invention, the lubricant is added to reduce the extruding pressure. However, the amount of lubricant added should be carefully controlled to maintain desirable mechanical characteristics of the product.

BRIEF DESCRIPTION OF THE DRAWINGS

Other features and advantages of the invention will be apparent from the following description taken in connection with the accompanying drawing wherein.

DESCRIPTION OF THE PREFERRED EMBODIMENTS

Figure 1:
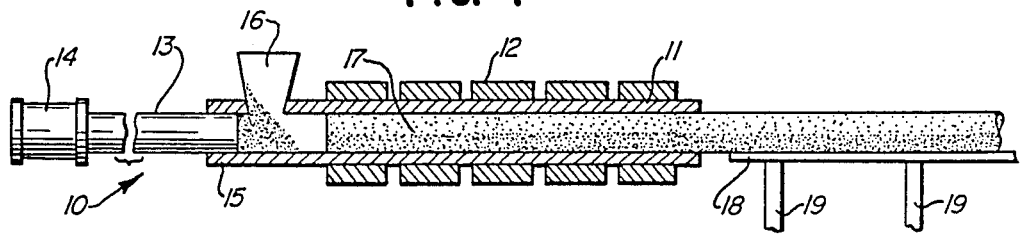
FIG. 1 is a fragmentary longitudinal section of a ram extruder as used in carrying out the method of the present invention to form a cylindrical rod product.

The invention will be described in greater detail with respect to the accompanying drawing.

The UHMW-PE powder used in the method of this invention preferably has a molecular weight greater than 3,000,000, as determined by a light scattering method, and more than 1,000,000 as determined by a viscosity method, such as, for example, utilizing the "Hostalen" GUR manufactured by Hoechst A.G., or the "Hi-zex Million" manufactured by Mitsui Petro Chemical Industries, Ltd.

The organic peroxide cross-linking agent preferably includes dialkyl peroxide, such as 2,5-dimethyl-2,5-di(t-butyl peroxy) hexane, dicumyl peroxide; and peroxyketal, such as 1,1-bis(t-butyl peroxy)3,3,5-trimethylcyclohexane, which has 10 hours half life temperature of 90° to 135° C. for generally cross-linking polyethylene. The cross-linking agent is preferably provided in powder form for improved dispersion in the UHMW-PE powder. The cross-linking agent preferably is provided in the amount of approximately 0.004 to 0.50 wt. parts (effective weight part) to 100 wt. parts of UHMW-PE. More specifically, in the preferred embodiments, it is present in 0.002 to 0.2 wt. parts, and further more specifically, in 0.012 to 0.12 wt. parts. It has been found that if more than approximately 0.5 wt. part is added, cracks tend to occur on the surface of the product during extrusion. Such crack formation tends to occur when more than 0.2 wt. part is added, and thus, preferably, the amount added should be less.

The lubricant used in carrying out the invention includes wax of montanic acid ester series, and wax of fatty acid derivatives (dicarboxylic acid ester, glycerin fatty acid ester, amide wax) in powdered state. The preferred amount is approximately 0.2 to 10 wt. parts to 100 wt. parts of the UHMW-PE, and more specifically, preferably 0.5 to 6 wt parts. If the content is greater than approximately 10 wt. parts, mechanical properties of the product are degraded.

The electroconductive agents preferably include conductive carbon black, such as acetylene black (trade name—Denka black, manufactured by Denki Kagaku Kogyo K.K.), Ketchen black EC, manufactured by Nippon E.C. Company), carbon fiber, and metallic powder, such as copper powder, iron powder, and silver powder. To minimize the extrusion pressure, the electroconductive agent is preferably provided in the amount of approximately 0.5 to 10 wt. parts, and more specifically, preferably 1 to 5 wt. parts to 100 wt. parts of UHMW-PE.

Other electroconductive agents used in the method of the invention include zinc oxide modified by metallic oxide, such as obtained by mixing a suitable amount of a metallic oxide, such as aluminum oxide, indium oxide or potassium oxide, with the zinc oxide and sintering the mixture at approximately 1000° C. in a reduced atmosphere. The amount added is preferably approximately 15 to 50 wt. parts of UHMW-PE, and more specifically, preferably 15 to 20 wt. parts. If the content is less than approximately 15 wt. parts, sufficient conductivity is not obtained, and if more than approximately 50 wt. parts is provided, the conductivity does not correspondingly increase while other mechanical properties, such as impact strength, are degraded.

A filler, or adding agent, may be added for the purpose of improving various physical properties and reducing the cost.

The ram extruder 10, as shown in FIG. 1, may comprise a conventional plunger-type extruder comprising a tubular barrel 11 having concentric heaters 12, a ram 13 which is reciprocated by a conventional hydraulic unit 14 in one end 15 of barrel 11. A supply unit 16 feeds the charge into end 15 of the barrel to be acted on by the ram therein. The material forms a sintered extrusion 17 which is delivered to a cooling stand 18 supported on legs 19.

The extrusion speed is suitably adjusted as a function of the barrel bore, the length of ram 13, and the heat capacity and temperature of heaters 12. The temperature of the heaters is preferably approximately 200° to 300° C. for a high temperature unit, and more specifically, preferably approximately 220° to 270° C. It is preferably 150° to 200° C. for a low temperature unit, and more specifically, preferably 150° to 180° C. therein. It has been found that if the temperature is higher than approximately 300° C., the UHMW-PE is thermally decomposed and deteriorated, and if the temperature is lower than approximately 150° C., the UHMW-PE is thermally expanded, thereby causing a size variation in the extruded product and/or insufficient sintering.

ILLUSTRATIVE EXAMPLES

Examples of the method of this invention will be described, it being understood that the invention is not limited thereto.

EXAMPLE 1

3 wt. parts of UHMW-PE (trade name—Hoechst wax E manufactured by Hoechst A.G.), and 0.004 wt. parts of 2,5-dimethyl-2,5-di(t-butyl peroxy)hexane (trade name of Perhexa 25B-40, manufactured by Nippon Oils & Fats Co., Ltd.) diluted to 40 wt % with calcium carbonate were mixed and the mixture uniformly dispersed in a Henschell mixer for 20 minutes. In three other mixtures, the mixing ratio of the UHMW-PE and montanic acid ester was maintained while 0.01, 0.50 and 0.60 wt. parts of peroxide was respectively mixed and similarly dispersed in the UHMW-PE and montanic acid ester. The four different uniformly dispersed mixtures were then ram extruded by a ram extruder 10 having a barrel having 76 mm internal diameter and a 3 meter length. The five adiabatic heaters 12 were each of 1 kW capacity. While maintaining the extruding conditions listed in Table 1, a round cross-linked rod of approximately 72 mm outer diameter was produced.

The parameters of the obtained round rods are indicated in Table 1.

TABLE 1

| Materials | Experiments No. | | | |
|---|---|---|---|---|
| | 1 | 2 | 3 | 4 |
| Mixture of materials (wtpt) | | | | |
| Hostalen GUR 412 | 100 | 100 | 100 | 100 |
| Hoechst wax E | 3 | 3 | 3 | 3 |
| Perhexa 25B-40 | 0.008 | 0.01 | 0.05 | 0.60 |
| (Peroxide conversion effective weight (parts) | (0.0032) | (0.004) | (0.20) | (0.24) |
| Extruding conditions | | | | |
| Cyl. heater temp. (°C.) | No. 1 to No. 5(230/270/270/200/170) | | | |
| Extruding pressure (kg/cm$^2$) converted to round rod sectional area | 390~407 | 407~441 | 441~475 | 475~492 |
| Extruding (kg/hr) | | | | 7.9 to 8.1 |
| speed (m/hr) | | | | 2.0 to 2.1 |
| Evaluation | | | | |
| Surface state of extruded rod | good | good | good | crack |
| Roundness of extruded rod (mm) | 1~1.5 | 0.5~1.0 | 0.2~0.3 | impossible to measure |

As seen in Table 1, the extrusion pressure in mixture No. 4 was very high, i.e. 475 to 492 kg/cm$^2$, resulting in a number of cracks on the surface of the extruded rod, while the rods formed from mixtures 2 and 3 developed no surface cracks.

Thus, the amount of the organic peroxide is preferably no more than approximately 0.50 wt. parts (0.20 of effective wt. part converted to peroxide). When the cross section displacement of the extruded rod (i.e. the difference between maximum and minimum diameters thereof) was measured with slide calipers, the displacement of the No. 1 rod was excessive, requiring cutting off approximately 0.5 to 0.6 mm of the surface layer to produce the desired uniform roundness. On the other hand, when the amount of peroxide was more than 0.01 wt. parts (0.004 of effective wt. part converted to peroxide), the desired uniform roundness was obtained without the need for cutting the rod surface.

EXAMPLE 2

8 further round rods, each having an approximate 72 mm outer diameter were formed in the same method as in Example 1 by using mixtures prepared by mixing constant amounts of Perhexa 25B-40 of 0.1 wt. parts (0.04 of effective wt. part converted to peroxide) with 0.1 to 15 wt. parts (as listed in Table 2) of Hoechst wax E. As shown in Table 2, with 1.0 to 0.5 wt. parts of Hoechst wax E, the extrusion pressure is very high, and extrusion speed is decreased whereby economic extrusion speed could not be obtained. Where the content of the wax was greater than 10 wt. parts, mechanical properties, such as Izod impact strength (ASTMD256), tensile strength, and elongation (JIS K6760) markably decrease. Resultingly, the preferred range appears to be approximately 0.5 to 10 wt. parts, as shown.

TABLE 2

| Materials | Experiments No. | | | | | | | |
|---|---|---|---|---|---|---|---|---|
| | 5 | 6 | 7 | 8 | 9 | 10 | 11 | 12 |
| Mixture of materials (wtpt) | | | | | | | | |
| Hostalen GUR 412 | 100 | ← | ← | ← | ← | ← | ← | ← |
| Hoechst wax E | 0.1 | 0.3 | 0.5 | 3 | 5 | 10 | 12 | 15 |
| Perhexa 25B-40 (Peroxide conversion effective weight (parts) | 0.1 (0.04) | ← | ← | ← | ← | ← | ← | ← |
| Extruding conditions | | | | | | | | |
| Cyl. heater temp. (°C.) | No. 1 to No. 5(230/270/270/200/170) | | | | | | | |
| Extruding pressure (kg/cm$^2$) converted to round rod sectional area | impossible | 475~492 | 441~475 | 407~441 | 390~407 | | | |
| Extruding (kg/hr) speed (m/hr) | — — | 5-6 1.3 to 1.5 | | 7.9 to 8.1 (2.0-2.1) | | | | |
| Evaluation | | | | | | | | |
| Roundness of extruded rod (mm) Displacement | — | | | 0.2-0.5 | | | | |

EXAMPLE 3

Five further round rods each having an approximate 72 mm outer diameter, were formed in the same method as that in the Example 1 under the extruding conditions listed in Table 3 by employing the mixtures of amide wax (trade name—Hoechst wax C, manufactured by Hoechst A.G.), acetylene black (trade name—Denka black, manufactured by Denki Kagaku Kogyo K.K.), conductive zinc oxide (manufactured by Honjo Chemical Co., Ltd.), and dicumyl peroxide (trade name—Percumyl D-40, manufactured by Nippon Oils & Fats Co., Ltd.) shown in the Table 3. When the cross section displacement of the extruded rod was measured—it was found to be less than 0.5 mm. The excellent roundness was obtained as shown even with the added filler in the mixture.

TABLE 3

| Materials | \multicolumn{5}{c}{Experiments No.} | | | | |
|---|---|---|---|---|---|
| | 13 | 14 | 15 | 16 | 17 |
| Mixture of materials (wt parts) | | | | | |
| Hostalen GUR 412 | 100 | ← | ← | ← | ← |
| Denka black | 1 | 1 | 3 | | |
| conductive zinc oxide | | | | 15 | ← |
| Hoechst wax E | 2.0 | | 6.0 | | |
| Hoechst wax C | | 2.0 | | 3.0 | ← |
| Perhexa 25B-40 (Peroxide conversion effective weight (parts) | 0.05 (0.02) | ← | ← | ← | |
| percumyl D-40 (effective wt part converted to peroxide | | | | | 0.05 (0.02) |
| Extruding conditions | | | | | |
| Cyl. heater temp. (°C.) | \multicolumn{5}{c}{No. 1 to No. 5(230/270/270/200/170)} | | | | |
| Extruding pressure (kg/cm²) converted to | 440~475 | 410~440 | 470~490 | 460~475 | 460~475 | placement of the cross section was measured, it was found to be 2 to 3 mm.

To improve the roundness to the desired uniformity, it was necessary to cut off 1.0 to 2.0 mm of the surface layer, resulting in a large loss of the rod material.

EXAMPLE 4

Figure 2:
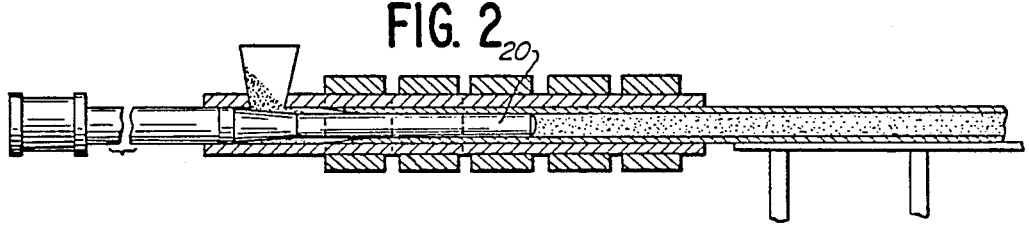
FIG. 2 is a fragmentary longitudinal section of a ram extruder as used in carrying out the method of the present invention to form a tubular product.

A tubular extrusion, or pipe, of UHMW-PE having an approximate 75 mm outer diameter and approximate 45 mm inner diamter was extruded by ram extruder 10 under the extruding conditions listed in Table 4 by employing a ram extruder having a 79.5 mm outer diameter and 400 mm ram length, a 50 mm outer diameter and 80 mm length of a mandrel 20 (as seen in FIG. 2). The barrel 11 had an 80 mm inner diameter and 1000 mm length, with 2 adiabatic heaters of 1 kW electric capacity. The six different mixtures used are listed in Table 4. When the displacement of the section of the extruded pipe was measured, the outer diameter displacement was only 0.4 to 0.6 mm, the inner diameter displacement was only 0.2 to 0.4 mm. Thus, excellent roundness was obtained.

TABLE 4

| Materials | \multicolumn{6}{c}{Experiments No.} | | | | | |
|---|---|---|---|---|---|---|
| | 18 | 19 | 20 | 21 | 22 | 23 |
| Mixture of materials (wt parts) | | | | | | |
| Hostalen GUR 412 | 100 | ← | ← | ← | ← | ← |
| Denka black | | 1 | 1 | 3 | | |
| Conductive zinc oxide | | | | | 15 | ← |
| Hoechst wax E | 2.0 | ← | | 6.0 | | |
| Hoechst wax C | | | | | 3.0 | ← |
| Perhexa 25B-40 (Peroxide conversion effective weight (parts) | 0.05 (0.02) | ← | ← | ← | ← | ← |
| percumyl D-40 (effective wt part converted to peroxide | | | | | | 0.05 (0.02) |
| Extruding conditions | | | | | | |
| Cyl. heater temp. (°C.) | \multicolumn{6}{c}{No. 1 to No. 2(235/195)} | | | | | |
| Extruding pressure (kg/cm²) converted to round rod sectional area | 291~302 | 302~312 | 302~312 | 312~327 | 302~312 | 301~312 |
| Extruding (kg/hr) speed (m/hr) | \multicolumn{6}{c}{4.8 to 5.2 (1.9-2.1)} | | | | | |
| Evaluation | | | | | | |
| Roundness of extruded rod (mm) Displacement | \multicolumn{6}{c}{0.4–0.6 (outer diameter) 0.2–0.4 (inner diameter)} | | | | | | round rod sectional area
Extruding (kg/hr) speed (m/hr)  7.5 to 8.0 (1.9–2.1)
Evaluation
Roundness of extruded rod (mm) Displacement  0.2–0.5

COMPARISON EXAMPLE 1

A round rod was extruded in the same manner as in Example 3 except that the cross-linking agent used in the Example 3 (Perhexa 25B-40 and Percumyl D-40) was not added. The extrusion pressure was 15 to 20 kg/cm² lower than in Example 3, and when the dis-

COMPARISON EXAMPLE 2

A pipe of UHMW-PE was extruded in the same manner as in Example 4 except a mixture was used in which the cross-linking agent in the Example 4 (Perhexa 25B-40 and Percumyl D-40) was not added. When the displacement of the section was measured, it was found to be 3 to 4 mm in the outer diameter and 2 to 3 mm in the inner diameter. The roundness was unsatisfactory.

EXAMPLE 5

5 wt. parts of acetylene black (trade name—Denka black, manufactured by Denki Kagaku Kogyo K.K.), 3 wt. parts of montanic acid ester (trade name—Hoechst Wax E, manufactured by Hoechst A.G.), and 0.1 wt. part of 2,5-dimethyl-2,5-di(t-butyl peroxy)hexane (trade name—Perhexa 25B 40, manufactured by Nippon Oils & Fats Co., Ltd.) were mixed with 100 wt. parts of UHMW-PE (trade name—Hostalen GUR 412, manufactured by Hoechst A.G.), and the mixture was dispersed in a Henschell mixer for 20 minutes. The uniformly mixed material was then ram extruded by a ram extruder 10 having adiabatic heaters providing 1 kW capacity, and having a 50 mm inner diameter and 2000 mm length for extruding a round rod of conductive cross-linking type having an approximate 48 mm outer diameter.

TABLE 5

Extruding conditions of round rod of conductive UHMW-PE

| Example Nos. | Heater temp. of cylinder (°C.) | | | Extruding pressure (kg/cm²) (converted to round rod sectional area) | Extruding speed | |
|---|---|---|---|---|---|---|
| | 1 | 3 | 5 | | kg/hr | m/hr |
| Example 5 | 220 | 270 | 190 | 996–1019 | 5.0–5.5 | 2.9–3.8 |
| C. Example 3 | " | " | " | 862–902 | 3.3–5.4 | 1.9–3.1 |

The obtained round rod was sectioned, and the surface resistance of the section was measured incrementally from the outer diameter to the center of the rod with 8 mm spacing between the measuring terminals. The surface resistance was substantially constant at approximately $10^3$ ohms from the outer circumference to the center of the rod, as shown in FIG. 2. Further, the surface condition of the extruded round rod was good, and the displacement of the section was only 0.1 to 0.2 mm.

COMPARISON EXAMPLE 3

A conductive round rod was extruded in the same manner as in Example 5 except the cross-linking agent used in Example 3 (Perhexa 25B-40) was not added. The extrusion pressure was 862 to 902 kg/cm² (slightly lower than the case of the Example 5). The surface resistance in the vicinity of the outer circumference of the extruded rod abruptly increased, as shown in FIG. 2. To make the surface resistance less than $10^3$ ohms, it was necessary to cut the surface layer by approximately 1 to 2 mm, with a large loss of the rod material. Further, the outer surface of the extruded rod was degraded having an 0.5 to 1.0 mm displacement and without gloss.

EXAMPLE 6

A conductive tube, or pipe, of UHMW-PE having an approximate 75 mm outer diameter and an approximate 45 mm inner diameter was extruded by a ram extruder having a ram of 79.5 mm outer diameter and 400 mm length. The mandrel had a 50 mm outer diameter and an 800 mm length. The barrel had an 80 mm inner diameter and 1000 mm length (with adiabatic heaters in two stages providing 1 kW of electric capacity) with the same mixture as in Example 5 and under the extruding conditions listed in Table 6.

TABLE 6

| No. | Heater temp. of cylinder (°C.) | | Extruding pressure (converted to pipe sectional area) | Extruding speed | |
|---|---|---|---|---|---|
| | No. 1 | No. 2 | | kg/hr | m/hr |
| Example 6 | 235 | 195 | 302–312 | 5.00 | 1.82 |
| C. Example 4 | " | " | 302–317 | 5.00 | 1.95 |

Figure 3:
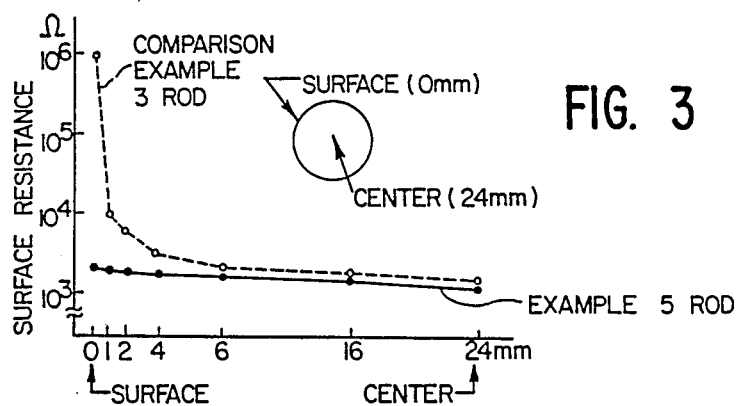
FIG. 3 is a graph illustrating the improved relationship between the distance from the surface and the surface resistance in an extruded rod formed by the method of the invention.
Figure 4:
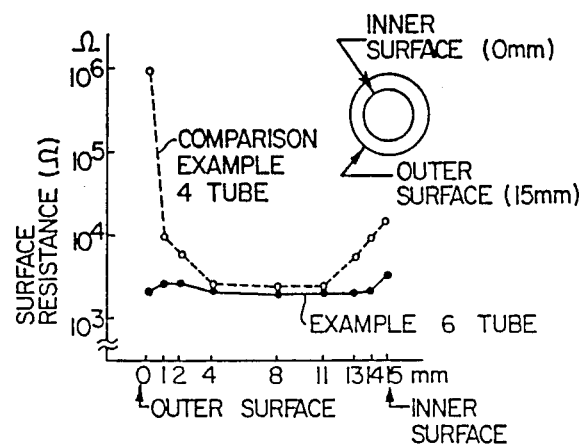
FIG. 4 is a graph showing the improved relationship between the distance from the surface and the surface resistance in an extruded tube formed by the method of the invention.

The pipe thus obtained was cut, and when the surface resistance in the section was measured, it was found to be substantially uniform from the outer surface to the inner surface of the pipe, as shown in FIG. 3. Further, the surface state of the extruded pipe was good, and the displacement was only 0.4 to 0.6 in outer diameter and only 0.2 to 0.4 mm in inner diameter.

COMPARISON EXAMPLE 4

A pipe of conductive UHMW-PE having approximate 75 mm outer diameter and approximate 45 mm inner diameter was ram extruded with a ram extruder having the same ram, mandrel and barrel as in Example 6, but with the mixture of Comparison Example 3. When the surface resistance of the section was measured similarly as in Example 6, the resistance in the vicinity of the outer and inner surface portions of the pipe abruptly varied and increased, as shown in FIG. 3.

Further, the surface of the extruded pipe was degraded and had a high displacement of 3 to 4 mm in outer diameter and 2 to 3 mm in inner diameter, without gloss.

EXAMPLE 7

Ultra high molecular weight polyethylene (trade name—Hostalen GUR 412, manufactured by Hoechst A.G.) or ultra high molecular weight polyethylene (trade name Hostalene GUR 415, manufactured by Hoechst A.G.), aluminum oxide modified zinc oxide (trade name—Zincoxide-1, manufactured by Honjo Chemical Co., Ltd.) as the electroconductive agent, lubricant (trade name—Hoechst wax E, manufactured by Hoechst A.G.), 2,5-dimethyl-2,5-di(t-butyl peroxy)-hexane (trade name—Perhexa 25B-40, manufactured by Nippon Oils & Fats Co., Ltd.) diluted to 40 wt % with calcium carbonate as the organic peroxide, as well as, as required, a red pigment (trade name Novoperm Red TG-02, manufactured by Hoechst A.G.), and a green pigment (trade name—Hostaperm-Green GG-01, manufactured by Hoechst A.G.) were mixed in the ratio shown in Table 8 by a Henschell mixer at 800 r.p.m. for 20 minutes, thereby obtaining a powdered UHMW-PE resin composition. The mixture was extruded by a ram extruder having a barrel with adiabatic heaters in 5 stages having a 76 mm inner diameter and 3 m length (i.e. two heaters of 1 kw capacity and three heaters of 0.5 kw capacity, providing temperatures of 230°, 270°, 270°, 200° and 170° C. incrementally from the supply inlet). A round conductive, cross-linked rod having an approximate 72 mm outer diameter was extruded.

The whiteness W (Lab) of the extruded rod was measured with a color meter (manufactured by Suga Test Machine Co., Ltd.) with OPTIC STANDARD (X:80.35, Y:83.03, Z:96.25), manufactured by the same company as reference plates.

The surface resistance was measured at a measuring voltage of 100 volts by a 4829A high resistance meter (manufactured by Yokogawa Hewlett-Package Co.), with copper wire terminals inserted into holes spaced apart 10 mm, each hole having a 2 mm diameter and 10 mm depth in the cut cross section of the rod.

The extruding conditions are shown in Table 7, and the mixing ratio and measured results are shown in Table 8.

TABLE 7

| Extrusion Nos. | Extruding pressure (kg/cm²) converted to round rod sectional area | Extrusion speed kg/hr | m/hr |
|---|---|---|---|
| Example 7 | | | |
| 7-1 | 460–475 | 7.5–8.0 | 1.8–1.9 |
| 7-2 | " | " | 1.8–1.9 |
| 7-3 | " | " | 1.7–1.8 |
| C. Example 5 | | | |
| 5-1 | 410–425 | | 2.0–2.1 |
| 5-2 | " | " | " |
| 5-3 | " | " | " |
| 5-4 | " | " | " |

TABLE 8

| | Ratio of mixture (wt parts) | | | | | | | | Surface resistance after a day (Ω) | Surface state | |
|---|---|---|---|---|---|---|---|---|---|---|---|
| | UHMW-PE GUR412 | UHMW-PE GUR415 | Al₂O₃ mod zinc oxide | Lubricant | *Organic peroxide | Pigment | Charge preventing agent | Color tone | | | |
| Example 7 | | | | | | | | | | | |
| 7-1 | 100 | 0 | 15 | 3.0 | 0.05 | 0 | 0 | Gray white W(Lab)=67 | $3.2 \times 10^9$ | good | 0 |
| 7-2 | 0 | 100 | 15 | 3.0 | 0.05 | 0.2 (red) | 0 | Fresh red | $6.1 \times 10^9$ | good | 0 |
| 7-3 | 0 | 100 | 22.5 | 3.0 | 0.05 | 0.2 (green) | 0 | Fresh green | $3.5 \times 10^9$ | good | 0 |
| C. Example 5 | | | | | | | | | | | |
| 5-1 | 100 | 0 | 0 | 0 | 0 | 0 | 0 | white | $10^{13}$ | " | 1 |
| 5-2 | 100 | 0 | 0 | 0 | 0 | 0 | 2.0(cation emulsion) | white | $10^{13}$ | " | |
| 5-3 | 100 | 0 | 0 | 0 | 0 | 0 | 3.0 (anion emulsion) | white | $10^{13}$ | " | |
| 5-4 | 100 | 0 | 0 | 0 | 0 | 0 | 4.0(nonion emulsion) | white | $10^{13}$ | " | |

*40%-diluted 2,5-dimethyl-2,5-di(t-butyl-peroxy)hexane

COMPARISON EXAMPLE 5

UHMW-PE (trade name—Hostalen GUR 412, manufactured by Hoechst A.G.), a charge preventing agent (cation surfactant, trade name CYASTAT SP, manufactured by Nippon Cyanamid Co.), a charge preventing agent (anion surfactant, trade name—Hostastat HS-1, manufactured by Hoechst A.G.), and a charge preventing agent (nonion surfactant, trade name—TB-123, manufactured by Matsumoto Yushi Pharmaceutical Co., Ltd.) were mixed, extruded and measured in the same manner as in Example 7.

The mixing ratios and measured results are listed in Tables 7 and 8. As shown in Table 8, the sintered product of the invention provides uniform conductivity with coloring, good surface condition, and maintained accurate roundness.

In summary, the present invention provides an ultra high weight polyethylene extrusion with minimized roundness deviation both in round rod and tubular pipe configurations. The extruded product has excellent external appearance, cutting, or finishing, time is reduced or eliminated, thereby minimizing waste of the raw materials. Further, uniformity of resistance, including at the surface portion of the extruded product, is obtained, providing uniform conductivity from the center to the circumferential surface. Surface resistance is enhanced. Metallic oxide modified zinc oxide may be used as the electroconductive agent, permitting different pastel colors to be provided, whereby the product is advantageously adapted for uses requiring high cleanliness and sanitary properties.

We claim:

1. A concurrently sintered and cross-linked ram extruded product comprising a mixture of ultra high molecular weight polyethylene powder, a cross-linking agent, an electrically conductive agent selected from the group consisting of conductive carbon black, metallic oxide, and metallic powder, and a lubricant, said product having a transverse dimensional deviation of less than approximately 2 mm., said electrically conductive agent being present in the amount of 0.5 wt. parts per 100 parts of said polyethylene powder.

2. A concurrently sintered and cross-linked ram extruded product comprising a mixture of ultra high molecular weight polyethylene powder, a cross-linking agent, an electrically conductive agent, and a lubricant, said electrically conductive agent comprising zinc oxide provided in an amount between 15 to 50 wt. parts per 100 wt. parts polyethylene powder, said product having a transverse dimensional deviation of less than approximately 2 mm.

3. The ultra high molecular weight polyethylene product of claim 2 wherein said electrically conductive agent is present in the amount of 15 wt. parts per 100 parts of said polyethylene powder.

4. The ultra high molecular weight polyethylene product of claim 2 wherein said electrically conductive agent is present in the amount of 15 to 20 wt. parts per 100 parts of said polyethylene powder.

5. The concurrently sintered, cross-linked ram extruded product of claim 2 wherein said metallic oxide comprises aluminum oxide.

6. The concurrently sintered, cross-linked ram extruded product of claim 2 wherein said metallic oxide comprises indium oxide.

7. The concurrently sintered, cross-linked ram extruded product of claim 2 wherein said metallic oxide comprises potassium oxide.

8. The concurrently sintered, cross-linked ram extruded product of claim 2 wherein said electrically conductive agent comprises aluminum oxide present in the amount of 15 wt. parts per 100 parts of said polyethylene powder.

9. The concurrently sintered cross-linked ram extruded product of claim 2 wherein said electrically conductive agent comprises aluminum oxide present in the amount of 22.5 wt. parts per 100 parts of said poyethylene powder.

10. The concurrently sintered cross-linked ram extruded product of claim 2 further including a filler.

11. The concurrently sintered cross-linked ram extruded product of claim 2 further including coloring material.

12. The concurrently sintered cross-linked ram extruded product of claim 2 further including pastel coloring material.

* * * * *